June 19, 1934.   A. J. WALKER   1,963,568
EMBEDDING CAPACITOR
Filed June 25, 1929

Inventor:
Angus J. Walker
By his Attorney
Philip Farnsworth

Patented June 19, 1934

1,963,568

UNITED STATES PATENT OFFICE 1,963,568

EMBEDDING CAPACITOR

Angus J. Walker, Roxbury, Mass., assignor, by mesne assignments, to General Electric Company, a corporation of New York Application June 25, 1929, Serial No. 373,608

3 Claims. (Cl. 175—41)

This invention relates to improvements in capacitors or electrostatic condensers, usually of the type operated at high frequencies as in radio communication, and generally under high potential and substantial amperage.

Among the objects of the invention is that of facilitating the separation of certain insulating material from a position of embedment about the stack of the capacitor when it becomes desirable to obtain access to the embedded stack or a part thereof for the purpose of repair or reconstruction.

In particular the object of the invention relates to the establishment of a film of mineral oil (or other good insulating liquid having high surface tension) around the stack before the insulating embedding material is placed in its position embedding the stack.

The invention consists of the methods and product described herein by way of example as shown in the drawing, of which Fig. 1 is a vertical sectional view, partly in elevation showing the first and second steps of the process, and illustrating a tank containing a liquid O in which a capacitor stack and its supporting and clamping casing are immersed (at left, first step) the capacitor being shown at right (second step) after removal from the body of liquid O in the tank;

Figures 1, 2:
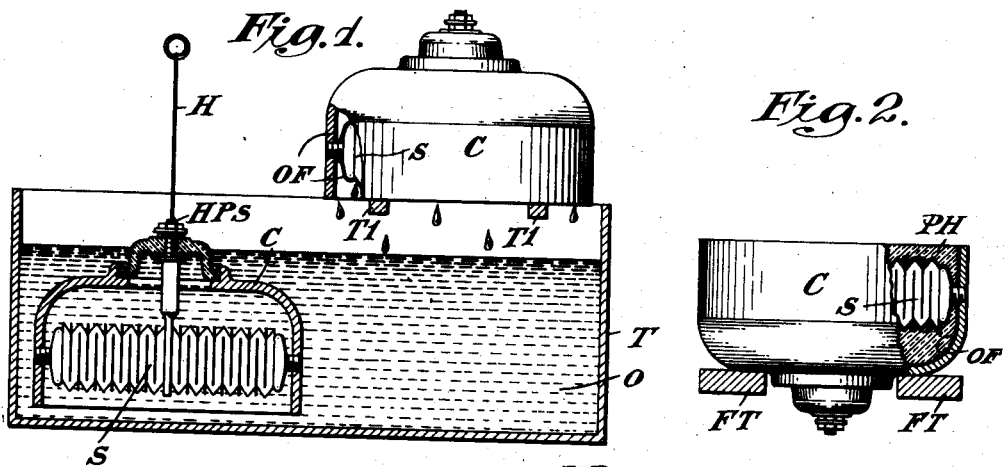
Fig. 2 is a side elevation, partly in section, showing the third step of the process, the capacitor stack and the casing containing the same being in inverted position, lacking the casing bottom-plate C1 of Fig. 3, and ready to have insulating material in heated molten condition poured in around the stack to constitute embedment PH.

Referring to the drawing, there is illustrated a capacitor stack S which usually consists of sheets of metal foil constituting the armatures, separated by sheets of dielectric material such as mica or other material preferably non-porous or non-absorbent of the material of film or barrier OF to be described. A high potential lead such as stud HPS extends from the midpoint of the stack S, the low potential ends of the stack being connected to a metal part C of the casing. Stack S usually consists of a plurality of capacitor sections as shown separated from one another by insulating (mica) sheets alternately projecting from opposite sides of the stack as shown, the successive sections being connected together in series by soldering together the projecting foils of adjacent sections.

Figure 3:
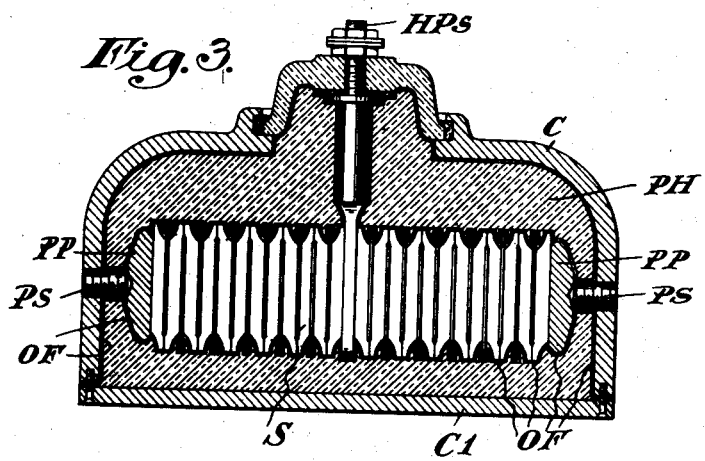
Fig. 3 is an enlarged, vertical section of the completed capacitor including its stack, the casing C containing the same, and bottom-plate C1 of the casing, all ready for service.

The condenser stack S is shown as disposed within a casing and is held in place between the metal end walls C thereof by pressure plates PP, Fig. 3, one at each end of the stack, and by the screws PS shown passing through said metal end walls so that metal portions of the casing itself serve without need of an independent clamping system, as a means holding the stack under the very high mechanical compression of a ton or more per square inch of the active area of the sheets of foil armatures and mica dielectrics. The casing usually is oblong in general correspondence with oblong stack S which here is shown as horizontal therein; but the casing may have other shapes, as circular, square or lozenge shape. The stack S may be of any suitable construction. In the case shown, the stack consists electrically of two portions, left and right of high potential stud HPS, arranged end to end, and each comprising a plurality of serially-connected sections; and from the midpoint of such stack the stud HPS is connected; all arranged so that the high potential portions are disposed centrally and most remote radially from the metal portions of casing C, and so that the adjacent ends of said two stack portions act as clamping members for said two portions and so that the outside ends of the entire stack in clamping relation with the parts PP and PS are of low potential so that the casing is a grounding means for the stack and the exterior of its metal portions can be safely exposed to human contact during service. This clamping of the stack has a useful function to be described later.

At one side, casing C is provided with an opening for lead HPS which is covered by the inverted bowl-shaped structure shown or insulating material such as tough, thick glass. The rim of this bowl rests on a ledge at the peripheral wall of the lead-opening of the casing. In the example shown, a locking recess is formed in the casing above said ledge, and the radially extending flange of the rim of the glass bowl is held permanently to casing C by fusible metal, cement or the like in said locking recess and on the bowl-rim. In Fig. 3, the stack S is shown in its completed condition, embedded in insulating material PH cast in casing C; and, as shown, the casing C is closed around PH by a bottom-plate C1 having a gasket between it and casing C and applied after casting of embedment PH. The mass of insulating material PH is placed in the casing C while the latter is inverted as in Fig. 2 and completely encloses stack S to constitute an embedment to protect it against moisture, and to insulate portions of the structure from one another which have high potential difference.

It is old to employ wax as the insulating embedment PH around the stack S. But sometimes wax is not suitable or desirable. For instance, it may become necessary to so locate or operate the capacitor that it is subjected to such high temperature that the wax becomes soft, with various undesirable results.

By my invention, a suitable material can be and is substituted for the wax embedment which does not readily soften or become semi-fluid during service. A flexible, black, asphaltic, pitch-like, sticky insulating material known to the trade as "pothead" is thus suitable because it has a melting temperature or flow-point of approximately 105 or more degrees C., i. e., substantially higher than (about twice as high as) the flow-point of wax so that it can withstand the desired higher temperatures. Pothead here and in the claims defines any of the sticky asphaltic or pitch-like materials known to the trade and having a flow-point high as compared to the wax usually employed, and substantial equivalents thereof. A disadvantage of embedding is that stacks after embedment sometimes break down on test whereupon in order to reclaim the uninjured valuable sections it is necessary to melt and remove the embedment. Pothead has the advantage over the wax usually employed that on cooling and solidifying as the stack-embedment it does not shrink as does wax with consequent formation of undesirable voids in the embedment near the stack; but an accompanying disadvantage is that such material tends to stick to the stack. Therefore, if this or other equivalent sticky asphaltic or pitch-like material is placed in the casing C and allowed to come into direct contact with stack S, it not only retains its higher melting point than the wax heretofore employed, but sticks in every little crevice of the exterior surface of the stack so that it can be removed from its position embedding the stack only by subjecting it directly to such high temperature (even in excess of the flow-point) that the entire stack (good sections as well as those injured during test) are injured or destroyed; i. e., the advantage of a sticky, non-shrinking (holosteric) material having a high flow-point in respect of not being readily liquefiable is discounted by its disadvantage due to the same properties in preventing ready dissociation of it from the embedded stack. As the result, the stack and particularly the foil portions thereof or the foil-connections are liable to be damaged in such a manner as to render the stack a total loss. In fact, when any such embedding material is used and adheres to the stack, it has not yet been found possible to remove the embedment so as to provide access for dissembly of the stack without ruining the entire stack beyond reclamation of any complete section thereof.

To overcome this difficulty, while employing a pothead material for the insulating embedment, I provide means for preventing direct contact between such embedment and the stack and the other parts inside casing C, by providing a heat barrier, the nature of which is to be described.

In Fig. 1 the tank or receptacle T contains a quantity O of a high-grade mineral oil known to the trade as "transil oil," a liquid which possesses good insulating quality. After the stack S has been assembled within the casing C as in Fig. 1 but before envelopment thereof in Fig. 2 by the hot molten embedding material PH and before the bottom-plate C1 of Fig. 3 has been applied, the structure comprising casing C and stack S of Fig. 2 (the casing serving as a clamping means to hold the capacitor sheets in intimate surface contact with one another) are dipped or submerged, preferably momentarily and but once, into the oil O in tank T. This dipping may be accomplished conveniently by securing a handle H to the end of stud HPS with the aid of the lead-attaching nuts carried thereby. The holding of the stack under the high compression of the clamping casing prevents oil O (having high surface tension) from creeping between the mica and foil sheets and entering the interior of the stack which would be extremely undesirable for operating conditions unless the dielectric is of paper and absorbs some of the oil the rest of which constitutes the coating OF; but when the dielectric is mica of course it does not absorb any of the oil. Prior to the assembly of the stack in the clamping casing, the sections thereof are built in and treated with molten wax and subjected to compression while the wax between the micas and foils is hot with the result that each section (each a completely operative capacitor unit) consists of a plurality of sheets held together by a thin enveloping sheath of solidified wax which has been squeezed out from between the sheets as a detergent carrying out everything save a thin film of wax from between the sheets, (including air, moisture, minute foreign particles, etc.) which might affect the capacitor operation harmfully if left between the sheets. Such thin wax sheath around each section and around stack S, if an embedment as wax is used, as heretofore, becomes melted by the molten embedment and merges with it in the permanent capacitor. And such an embedment of wax can be removed readily from the stack so as to reclean good sections, by application of heat which does not injure any part of the stack or other assembly of armatures and interposed dielectric. But when a pothead material is employed as at PH, Fig. 2, while the pothead is prevented from entering between the stack-sheets by the compression of the stack is maintained during the embedding operation and before solidification of the cast pothead embedment, yet the pothead constitutes such a comparatively refractory solid around the wax-sheathed stack as to require for removal, an amount of heat which not only melts the wax sheath around the stack, but as above is liable to ruin the entire stack.

As a result of the above dipping operation, all interior exposed parts of casing C and the inverted insulating bowl cover, in addition to the stack S itself, are covered or coated with a thin film OF of the oil O in tank T. When this coating is of mineral oil, as above, I find that it does not change the phase angle of the capacitor as is the case with some other oils, such as paraffin oil, altho the latter may be used herein as a less desirable equivalent of the transil or other mineral oil.

Immediately after the dipping operation, the casing C and the thereby-carried stack S is removed from the bath in tank T, as at the right of Fig. 1 and the superfluous oil permitted to drip or drop back into the tank T. At this time, the casing may be supported, for a substantial period, by members T1 carried by the top of tank T thereof. After the dripping ceases, the casing and the thereby-carried stack S, now having the protective film OF thereon, Fig. 2 may be supported in the inverted position illustrated by portions FT of the capacitor-filling table. The pothead PH or its equivalent in molten condition now may be poured into the inverted casing C and insulating bowl and around stack S so that the casting when cooled and solidified constitutes a desirable permanent embedment for the stack.

The embedment PH however, is prevented from directly contacting with any of the parts by the protective film OF since the latter acts as a barrier and separates said PH from the stack S, from the interior of casing C and from the other parts. The film OF also tends to preserve the original thin wax sheaths around the individual sections of the stack and around the stack. After PH has been applied, as just described, and allowed to cool and solidify, gasket 9 and bottom-plate C1 of Fig. 3 may be applied to the bottom of casing C. The assembled structure, re-inverted to normal position of Fig. 3, is then ready for use. The stack-clamping by casing C is a permanent clamping so that in service the film OF is prevented from access between the stack sheets; for the stack is held under such very great compression and the stack-sheets thereby are held in such intimate surface contact that not even the film OF when of oil can enter between the sheets.

Figure 4:
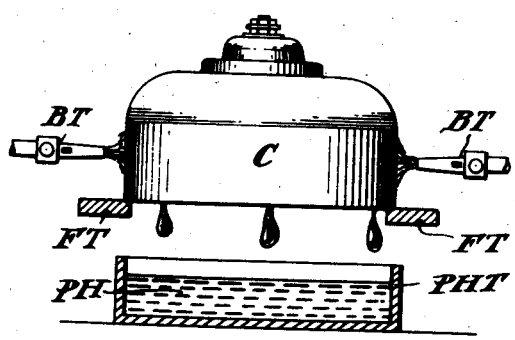
Fig. 4 is a vertical section, partly in elevation, illustrating a capacitor which has been injured by testing current or service, and showing the removal of the insulating embedding material PH from its position inside the casing and around the stack by the application of heat.
Figure 5:
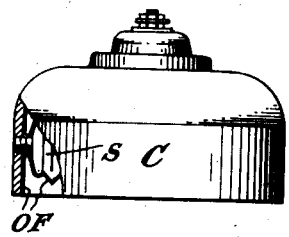
Fig. 5 is a side elevation of the structure shown in Fig. 4, partly in section to show the conditions after the insulating embedment PH of Fig. 3 has been removed so that the stack S can be disassembled from its clamping casing C, removed, and its injured sections removed and replaced, the good sections being reclaimed.

In the event that the condenser stack S or a part thereof breaks down on test, or, if for any other reason it becomes necessary to remove stack S from its casing C or to obtain access to a portion of the stack while in the casing, the casing with bottom C1 removed, may be supported upon filling-table-members FT Fig. 4, and heat applied to its exterior from the flames of a pair of Bunsen torches BT or the like. During continued application of this heat, the embedment PH softens or becomes semi-fluid and drops or drips into a receptacle or tank PHT provided therefor beneath casing C, said receptacle, after a time, receiving all the stack-embedding material PH formerly housed within the casing. That is the application of heat to the metal casing but not directly to portions of the embedment closely adjacent the stack, is sufficient to meet all parts of the embedment, even such portions closely adjacent to the stack, so that by gravity the entire molten embedment is removed from the stack, leaving on the stack only the comparatively thin coating OF which of course offers no obstruction to access to the stack for disassembly from the casing. The application of the Bunsen flames to both sides of the metal casing quickly melts the embedment above and below the stack and on the sides thereof and between the sides of the casing. The metal sides of the casing conduct the heat to the entire outer surface of the embedment and the embedment itself conducts heat to its interior portions around the higher potential central portions of the stack. By the above application of heat, the stack is prevented from injury by the heat necessary to melt all portions of the embedment. As the lower portions of the melted embedment fall away from stack S, the latter is exposed gradually to air which in addition to the metal wall of the casing is interposed between the stack and the Bunsen flames, but yet the metal of the casing conducts heat to the unmelted upper portions of the embedment, until finally the embedment is removed completely from around coating OF on the stack so that the latter can be released from its clamped assembly within the casing and removed therefrom for repairs. Of course it is not necessary to remove all the embedment from the upper portion of the casing above the stack, all that is necessary being to remove enough of the embedment to permit removal of the stack. In the lack of some such suitable coating OF as herein disclosed, it is not possible to remove all portions of such embedments as pot-heads from around the stack by applying heat to the metallic portions of the casing adjacent the embedment. At the start of the operation of Fig. 4 it is not necessary to apply the flames to the exterior of the casing, but the latter becomes important when only a comparatively slight thickness of the embedment remains around the stack and when therefor the application of sufficient heat to remove said remaining embedment would injure the stack if applied directly to the embedment instead of to the casing. But even then the flames may be applied to the interior wall of the casing provided that they are not applied to the embedment itself. Repairs now may be effected to the stack S at will, its condition now being as illustrated in Fig. 5, i. e., lacking stack-embedding material PH of Fig. 3. The stack now may be removed from its casing-clamp and then dis-assembled, the injured sections removed and the good sections re-claimed and used with new sections in restoring the stack to its desired condition.

For the reason that the embedment PH when of asphaltic character as of a pot-head material, is extremely sticky and pitch-like it would adhere or cling to stack S and to the other parts inside casing T, were it not for the presence of the oil film OF, so that, to effect the removal of PH from the assembly of Fig. 3 it would be necessary to apply heat directly and locally to parts of PH closely adjacent to stack S and to the other parts inside C. Such direct application of heat, ordinarily, would damage the stack structure S beyond any hope of practical repair.

Accordingly, by my invention, it becomes practical to embed a condenser stack with an insulating material (such as asphaltic material or pothead PH) having a flow-point substantially higher than that of wax, while at the same time permitting ready removal of insulating embedment from the condenser stack without damaging the same by high temperatures. Experience has proved that the presence of oil-film OF as above does not conflict with the performance of any of the useful functions of the stack-embedment. Heretofore all pothead-embedded capacitor stacks which were rejected on test were a total loss, but by the practice of this invention there is reclamation of all parts of such rejected capacitors which have been injured by test or in service.

It is to be understood that the invention is not limited to the embodiment and features specifically shown and described herein, but that such embodiment and features are subject to changes and modifications without any departure from the spirit of the invention. Other suitable materials may be used instead of the mineral oil OF and for asphaltic material PH here described respectively for coating and for embedding the condenser stack.

In any form of the invention the embedment PH is in close thermal relation with the interior of some heat-conducting portion of the casing, such as C, (owing to the thinness of coating or film F when that is applied to the casing at the time of application to the stack, as shown), so that the embedment PH can be reduced to its flow-point by the application of heat, as for example in Fig. 4, to the exterior of casing-portion C.

In practice, with capacitors heated as above, the liquid insulating film OF prevents adherence of the pitch-like embedment PH to the stack and permits the application of heat sufficient to melt the higher flow-point embedment and permit its removal without requiring the use of temperatures high enough to injure any part of the stack, the film or coating OF itself offering no obstruction to access to the stack, so that upon such access to the stack and its removal from its clamping relation with casing C the stack-section or sections not injured by test can be removed and rec'aimed and used to make up a new stack with new good sections to replace those injured during test. Apparently these results are obtained because the film OF acts as a barrier preventing PH from sticking to the stack; altho it may be that film OF acts also as a barrier or shield for the stack against the heat needed to melt PH. Of course, after PH has been melted and dropped away, the thin insulating coating OF permits free access to assemblies for dis-assembly of its parts.

The difference between the lack of film or coat OF and its presence is that without it, it is not possible to remove the pothead embedment from the stack without injury to the stack by the heat necessary for such removal, the stack being a total loss if the pothead, in the lack of OF is removed completely, whereas when thin coating OF is used it is easy to remove all the pothead, without the least injury to any portion of the stack. It is not claimed that the presence of thin coating OF prevents injury to the capacitor under electrical conditions of tests but under conditions of practical removal of embedment PH. If desired, the film OF may be of suitable insulating material such as one of the well-known insulating varnishes, which altho applied in liquid or semi-liquid form, yet may dry or harden comparatively quickly after application, and more or less solidify on cooling so as to serve equally well as a barrier as above, while yet offering no substantial obstruction to the dis-assembly of the elements of the stack after removal of the insulating embedment; and in case of the employment of such insulating material the dielectric sheets need not be non-porous unless the drying or solidification of film OF is not speedy, in which case it yet may be desirable to employ non-porous dielectrics such as mica sheets.

I claim:

1. In a capacitor, the combination with an assembly of metal armatures and mica dielectric, of a normally solid pothead embedment around said assembly, and a film of transil oil coating said assembly and intervening between said embedment and assembly.

2. In a capacitor, the combination with an assembly of die'ectrics and metal armatures, of a normally solid pothead embedment around said assembly, and a film of transil oil coating said assembly and intervening between said embedment and assembly.

3. A capacitor including a stack, a casing having a heat-conducting wall-portion, an embedment of insulating material inside the casing around the stack and adjacent said heat-conducting wa'l, said embedment having a high flow-point providing for solidarity under stack-service-temperatures but reducible to its flow-point by temperatures harmless to the stack-elements and applied by way of said heat-conducting casing-wall, but also having a consistency tending to stick to and around the embedded stack even at its flow-point and cause impracticability of access to the stack for repair-disassembly in the lack of embedment-heating harmful to the embedded stack-elements; and a relatively thin coating of heat-conducting insu'ating material on the stack and thereby intervening between the stack and the relatively thick embedment, said intervention preventing said sticking of the embedment to the stack when fluid and providing for ready removal of the embedment without injury to the stack-element upon the application thru the heat-conducting wall-portion of the casing, of heat melting the embedment; said coating also being located on the interior of said heat-conducting casing-wall and intervening between said wall and the embedment and the thinness of said heat-conducting intervening coating on said wal! providing for effective conduction of heat from the heat-conducting casing-wall to the embedment, and said thinness of the coating on the stack providing for ready access to the stack for repair-disassembly upon such removal of the embedment from the stack.

ANGUS J. WALKER.